3,211,796
3,5,5-TRIMETHYLHEXANOYL PEROXIDE
Andrzej Pajaczkowski, Harpenden, England, assignor to Imperial Chemical Industries Limited, London, England, a corporation of Great Britain
No Drawing. Original application Aug. 5, 1960, Ser. No. 47,615, now Patent No. 3,129,206, dated Apr. 14, 1964. Divided and this application Sept. 30, 1963, Ser. No. 312,287
Claims priority, application Great Britain, Feb. 14, 1958, 4,870/58; Aug. 12, 1959, 27,568/59
1 Claim. (Cl. 260—610)

This application is a division of my copending application Serial No. 47,615, filed August 5, 1960. Said Serial No. 47,615, now issused as 3,129,206, is a continuation-in-part of Serial No. 791,285, filed February 5, 1959, the latter having been abandoned for another continuation-in-part, namely Serial No. 73,486 filed December 5, 1960 and now issued as U.S. Patent 3,019,214.

The invention relates to improvements in the polymerization of ethylenicaly unsaturated compounds.

It is known to use certain peroxy compounds, including diacyl peroxides, as catalysts, or initiators, for the polymerization of ethylenically unsaturated compounds. Diacyl peroxides that have been found to be particularly useful for this purpose include diacetyl, dilauroyl and dibenzoyl peroxides.

According to the present invention there is provided a new catalyst, namely, 3,5,5-trimethylhexanoyl peroxide, which is suitable for the polymerization of a compound containing the group $>C=CH_2$, wherein at the most one of the free linkages is satisfied by a hydrogen atom.

Besides being a highly efficient catalyst, with a half-life of 125 mins. at 80° C., 3,5,5-trimethylhexanoyl peroxide has certain advantages over acetyl, benzoyl and lauroyl peroxides, which have been commonly used hitherto; for example, it is a liquid under normal conditions and has a greater solubility in the monomers to be polymerized and is therefore more easily handled and more easily dispersed in the monomer. It is also substantially completely odorless.

3,5,5-trimethylhexanoyl peroxide can be prepared from 3,5,5-trimethylhexanoic acid (which may in turn be produced from 3,5,5-trimethylhexanol or 3,5,5-trimethylhexanal as made by the well-known oxo hydroformylation process) by any of several well known chemical methods, for example, by converting the acid to its chloride and reacting the latter with hydrogen peroxide in the presence of a base.

Monomers that may advantageously be polymerized or copolymerized with each other by the process of this invention include for example: vinyl phthalimide; acrylic monomers, for example, methyl methacrylate, methyl acrylate and acrylonitrile; styrene; diallyl esters; vinylidene chloride; and dienes such as butadiene. The process may be carried out as a conventional polymerization process for the particular monomer, e.g., bulk, solution, granular or emulsion, with 3,5,5-trimethylhexanoyl peroxide replacing the conventional catalyst. Polymerization temperatures of between 25 and 100° C. will normally be used. The pressure may vary over a wide range, e.g., from 1 to several atmospheres, e.g., 25 atmospheres, in accordance with the normal practice with the monomer concerned. The present catalyst will normally be used in amounts of from 0.01% to 2.0% by weight of the monomeric material. It may be used, if desired, together with an activator, that is a compound that promotes the decomposition of peroxides, e.g., a reducing agent in the well-known redox systems. Other conventional ancillary ingredients may be present, e.g., chain transfer agents, pigments, plasticizers, etc.

The present invention is illustrated but in no way limited by the following examples, in which all parts given are by weight. The catalyst used in each of the examples was prepared in the following manner:

To a mixture of 17 vols. of 3,5,5-trimethylhexanoyl chloride and 8 vols. of 100-volume hydrogen peroxide cooled to 0° C., were added in small portions and with constant stirring and cooling 8 vols. of pyridine. After the addition was complete, the mixture was stirred for 1 hour at 0° C. The organic layer was separated, washed with water and with a solution of sodium bicarbonate, diluted with ether and dried over anhydrous calcium chloride. Ether was removed; the residue (11 vols.) was a liquid of refractive index ($n_D^{20}$) 1.4382, had an infra red spectrum showing it to consist principally of 3,5,5-trimethylhexanoyl peroxide (carbonyl absorption at 1818 and 1785 cm.$^{-1}$), liberated iodine from acidified aqueous potassium iodide, and evolved gas on being heated to 95° to 115° C.

*Example 1*

100 parts of methyl methacrylate were mixed with 1 part of 3,5,5-trimethylhexanoyl peroxide, present as a 1% w./v. solution in white spirit, and heated at 80° C. in an atmosphere of nitrogen. After 2 hours the mixture had solidified to a colorless, vitreous polymer.

*Example 2*

100 parts of styrene were mixed with 0.3 part of 3,5,5-trimethylhexanoyl peroxide, present as a 3% w./v. solution in white spirit, and heated at 80° C. in an atmosphere of nitrogen. After 3 hours the mixture had solidified to a colorless vitreous polymer.

*Example 3*

Into a stirred stainless steel autoclave were charged 240 parts of water, 0.42 part of gelatin and 0.24 part of 3,5,5-trimethylhexanoyl peroxide. The autoclave was closed and the contained air replaced with nitrogen. 120 parts of vinyl chloride were then charged and the vessel was heated to, and maintained at, a temperature of 50° C. The stirrer was driven at 720 r.p.m. After 16 hours the residual monomer was vented and the suspended polymer filtered from the aqueous phase, washed and dried. 87% conversion of monomer was obtained.

*Example 4*

0.1 part of 3,5,5-trimethylhexanoyl peroxide were dissolved in 100 parts of methyl methacrylate and the mixtured heated at 40° C. until it turned into a hard block, whereupon the temperature was raised to 110° C. and maintained at this temperature for 1 hour to complete polymerization of the monomer. The resulting product was a hard, transparent polymer having a Vicat softening point of 122° C.

*Example 5*

159 parts of acrylonitrile were mixed with 0.20 part of 3,5,5-trimethylhexanoyl peroxide, present as a 0.025% w./v. solution in toluene, and heated at 70° C. in an atmosphere of nitrogen. After 1.25 hours the mixture was poured into methanol and the solid precipitate was removed by filtration, washed with methanol and dried to give 52 parts of polyacrylonitrile.

For comparison purposes, Example 5 was repeated replacing the catalyst used therein by an equal quantity of lauroyl peroxide, and extending the reaction time at 70° C. to 4½ hours. The yield of polymer was 3.2 parts only.

*Example 6*

94 parts of methyl methacrylate were mixed with 0.2 part of 3,5,5-trimethylhexanoyl peroxide present as a 0.2% w./v. solution in toluene, and heated at 80° C. in an atmosphere of nitrogen. After 2 hours the mixture was poured into methanol and the solid precipitate was removed by filtration, washed with methanol and dried to give 46.4 parts of polymethyl methacrylate.

*Example 7*

90 parts of styrene were mixed with 0.02 part of 3,5,5-trimethylhexanoyl peroxide present as a 0.02% w./v. solution in toluene, and heated to 80° C. in an atmosphere of nitrogen. After 2.5 hours the mixture was poured into methanol and the solid precipitate was removed by filtration, washed with methanol and dried to give 29.6 parts of polystyrene.

For comparison purposes, Example 7 was repeated, replacing the catalyst used therein by an equal quantity of lauroyl peroxide. The yield of polymer was 15 parts only.

I claim:
3,5,5-trimethylhexanoyl peroxide.

References Cited by the Examiner
UNITED STATES PATENTS
3,129,206   4/64   Pajaczkowski.

FOREIGN PATENTS
849,028   9/60   Great Britain.

OTHER REFERENCES
Cooper, Chem. Soc. Jour., pages 3106–13 (1951).

LEON ZITVER, *Primary Examiner.*
HAROLD G. MOORE, *Examiner.*